May 16, 1939.　　　　E. L. WIEGAND　　　　2,158,605
HEATING APPARATUS
Filed April 13, 1937　　　2 Sheets-Sheet 1
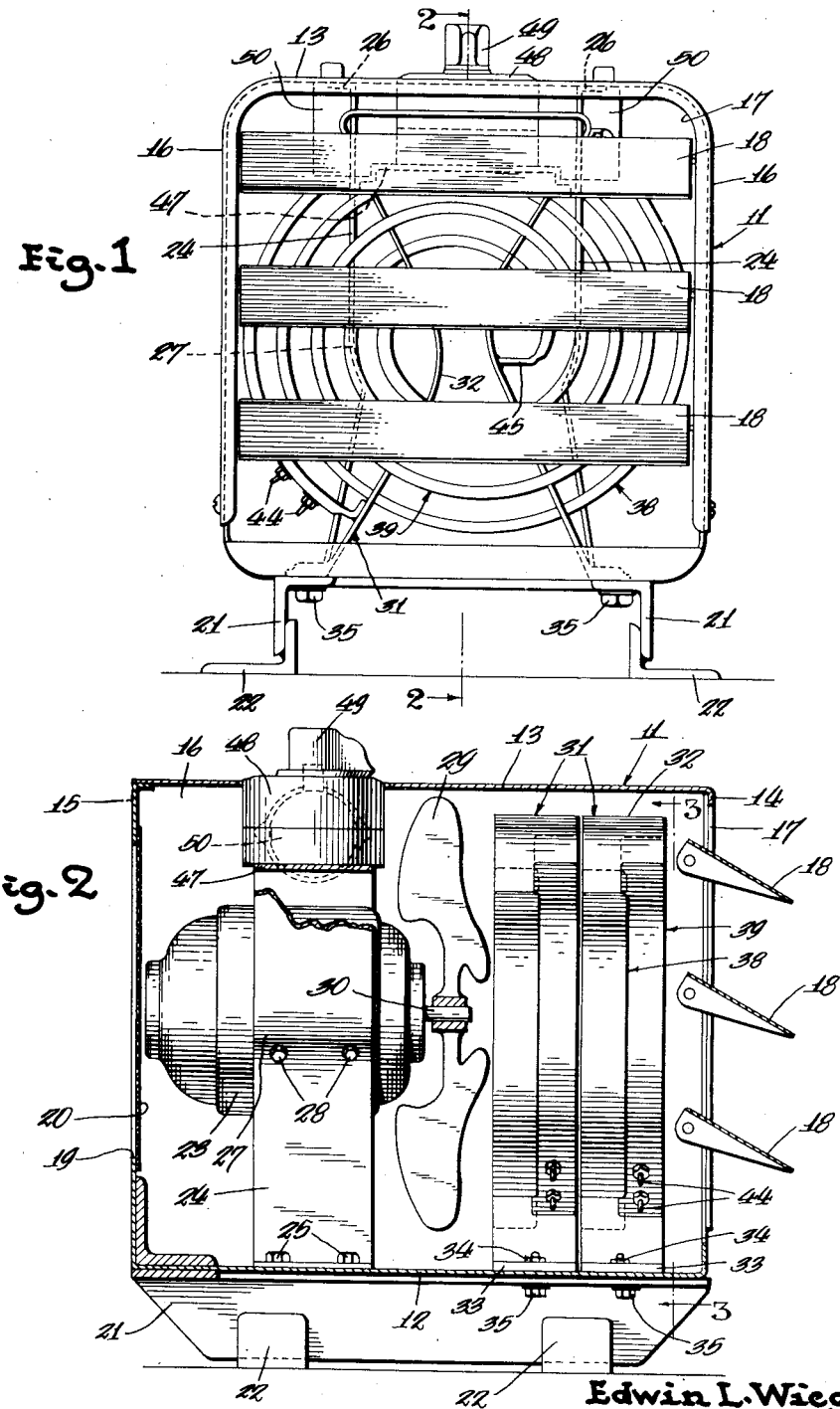
Edwin L. Wiegand
INVENTOR
By Freeman, Sweet, Albrecht, and Weidman
ATTORNEYS

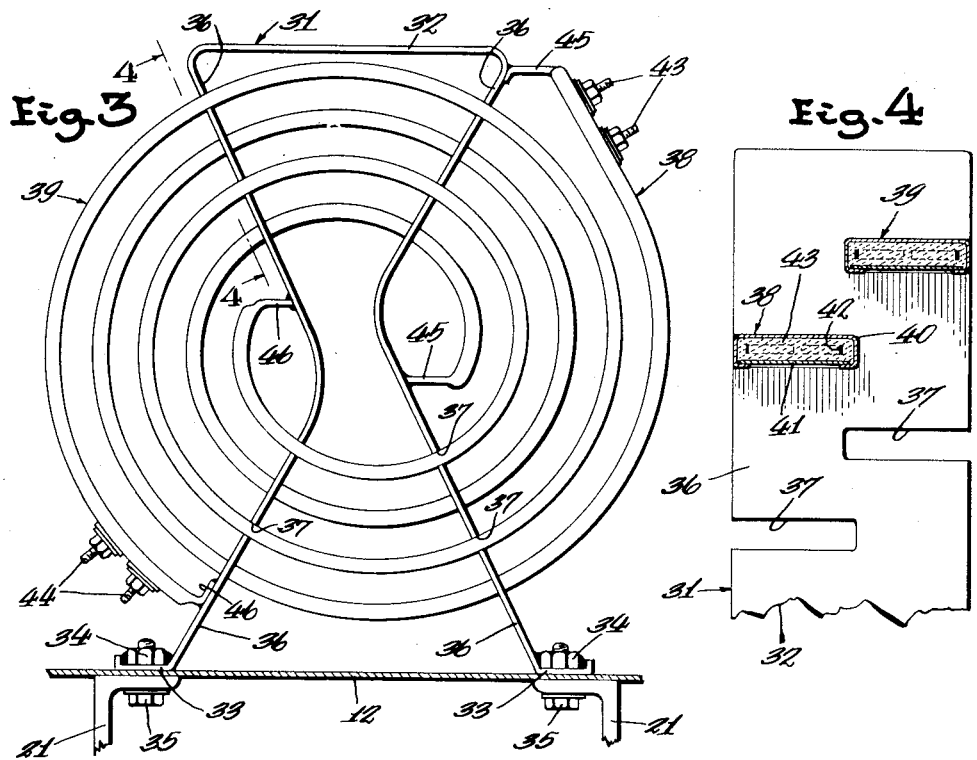
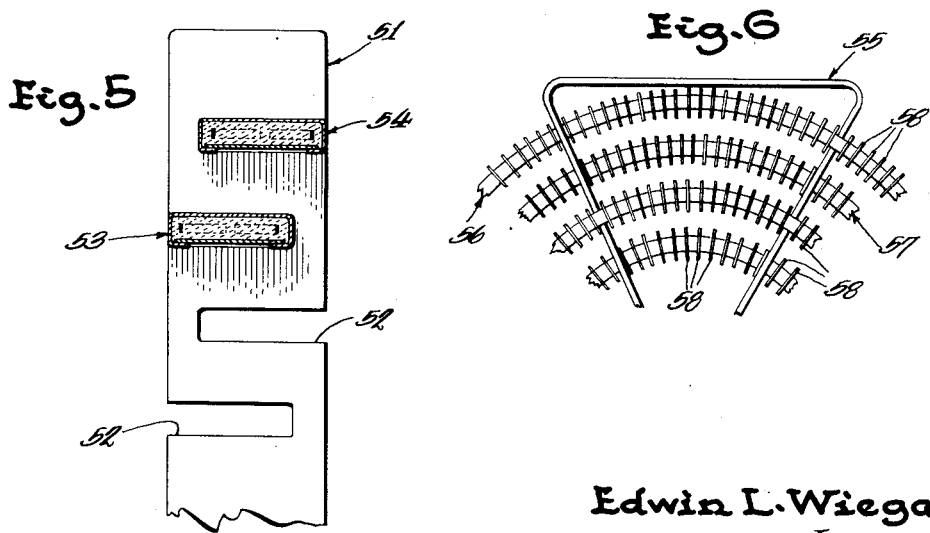

Patented May 16, 1939

2,158,605

UNITED STATES PATENT OFFICE 2,158,605

HEATING APPARATUS

Edwin L. Wiegand, Pittsburgh, Pa.

Application April 13, 1937, Serial No. 136,591

18 Claims. (Cl. 219—39)

My invention relates to heating apparatus, and more particularly to electrical heating apparatus of the forced circulation type, and the principal object of my invention is to provide new and improved heating apparatus of these types.

In the drawings accompanying this specification, and forming a part of this application, I have shown for purposes of illustration, several forms which my invention may assume, and in these drawings:

Figure 1 is a front elevational view of an embodiment of my invention,

Figure 2 is a sectional view corresponding generally to the line 2—2 of Figure 1, parts being shown in elevation, and parts being broken away, Figure 3 is an enlarged view corresponding generally to the line 3—3 of Figure 2, parts being broken away, Figure 4 is an enlarged fragmentary section corresponding generally to the line 4—4 of Figure 3, parts being omitted so as to more clearly show the construction, Figure 5 is a view similar to Figure 4 but showing a different form which the support member may assume, and Figure 6 is a fragmentary view showing heat dissipating fins on the heating units.

Referring particularly to Figures 1 and 2, the embodiment of the invention disclosed comprises a casing 11, having a bottom wall 12, a top wall 13, a front wall 14, a rear wall 15, and side walls 16. The front wall 14 is apertured as shown at 17, and a plurality of louvres 18 are pivotally supported across the opening 17 to adjustably control the size of this opening, and also direct heated air passing therethrough. The rear wall 15 is apertured as shown at 19, and a screen 20 may be placed over the aperture 19 to prevent objectionable material from entering the casing 11. Angle bars 21 are secured to the bottom wall 12 of the casing 11, these angle bars 21 respectively having feet 22 secured thereto in any suitable manner, such as by brazing, or the like.

An electric motor 23 is disposed within the casing 11, and is supported therein by means of straps 24, the lower end of each strap being secured to the bottom wall 12 of the casing 11 by means of bolts 25, and the upper end of each strap is provided with an angular foot 26 which may be secured to the upper wall 13 in any suitable manner. The intermediate portion of each strap 24 is preferably arcuate, as shown at 27, to conform generally to a portion of the outer surface of the motor 23, and bolts 28 are provided to hold the motor in position with respect to the straps 24. A fan 29 is secured to the armature shaft 30 of the electric motor 23, and is driven by the motor 23 to draw air in through the aperture 19 in the rear wall 15, and expell air through the aperture 17 in the front wall 14.

Disposed intermediate the fan 29 and the front wall 14, is a pair of support members 31, for supporting the means for heating the air stream flowing through the casing 11. Each support member 31 comprises a single strip 32 having a greater width than thickness, and bent to generally X-shape, as best shown in Figure 3. The extremities of the strip 32 are bent to form feet 33 which receive screw-threaded nuts 34, cooperable with bolts 35, for holding the support member to the casing 11. The bolt 35 may also pass through the angle bars 21, so as to provide a rigid base for the supporting members 31. The legs 36, formed by the X-shaped strip 32, are provided with recesses 37 in the opposite edge marginal surfaces thereof, as best seen in Figure 4, and the strips 32 are positioned to have their wide surfaces parallel to the air stream, so as to provide a minimum of resistance to this air stream.

The heating means preferably used are of the electrical resistance type, and a pair of heating units 38 and 39 is here shown to be supported by each supporting member 31. The electrical heating units 38, 39 are preferably of non-rectilinear shape, and as shown in Figure 3 are spirally formed, and positioned so as to appear to be in intercalated relation in Figures 1 and 3. As best shown in Figure 4, the heating units 38, 39 preferably have at least a portion disposed in a common transverse plane. Each heating unit comprises an outer metallic sheath 40, of generally channel form, the channel being closed by a metallic plate 41, to form a generally closed tube having an oblong cross-section. Disposed within the tube so formed is an electrical resistance element 42, spaced from the walls of the tube by means of compactible material 43, preferably of the type having electrical insulating qualities, while at the same time conducting heat. The resistance elements 42 of the heating units 38 and 39 are respectively provided with terminals 43 and 44, to provide for electrical connection.

The recesses 37 in the supporting strips 32 are constructed and arranged to receive the spiral heating units 38 and 39, and as shown in Figure 4, the heating unit 38 is received within the left-hand set of recesses 37, while the heating unit 39 is received within the opposite right-hand set of recesses 37.

The heating units 38 and 39 may be held within the respective recesses formed in the supporting member 31 by reason of their resiliency, or these units may be secured as by means of brazing or the like. It will be obvious that only one supporting member 31 carrying only one pair of heating units 38 and 39 may be used in this embodiment, and also, if desired, only one heating unit may be supported by the supporting member. As shown, the heating units are mounted edgewise with respect to the air stream flowing through the casing 11.

As shown in Figure 3, the extremities 45 of the heating unit 38, and the extremities 46 of the heating unit 39 are closed, this closing preferably being effected by squeezing together the walls of the tube forming the casing for the respective heating unit. These ends 45 and 46 may be secured to the supporting strip 32, in any suitable manner, the drawings showing these ends as being brazed to the strip 32.

Referring to Figures 1 and 2, it will be seen that the straps 24 supporting the motor 23, also provide a support 47 for an electrical control switch 48. The switch 48 is provided with an actuator knob 49 for the purpose of moving the switching elements of the switch 48 to various operative relations. The switch 48 may connect the heating units 38, 39 to a source of electrical current (not shown), in any desired manner, and electrical cut-outs 50 may be interposed in the circuit for cutting out the heating units in the event that the motor 23 fails to operate, or for any other purpose.

Referring to Figure 5, a supporting member 51 is shown, this supporting member being similar to the supporting member 31, and having recesses 52 entering from opposite marginal edge surfaces. The recesses 52 receive portions of heating units 53, 54, which may be similar to the heating units 38, 39, hereinbefore described, but as shown in Figure 5, the recesses 52 are so spaced that the heating units 53, 54 are substantially disposed in a common plane.

Referring to Figure 6, there is shown a supporting member 55, similar to the supporting member 31, and supporting heating units 56 and 57, similar to the heating units 38 and 39, but in this instance the units 56 and 57 are provided with fins 58, of any desired configuration, and secured to the units in any desired manner, the fins 58 serving to rapidly dissipate the heat provided by the units 56 and 57.

From the foregoing it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Heating apparatus, comprising: a plurality of arcuate-shaped heating units; and a supporting member, formed of a single strip bent to generally X-shape, each leg of said member being provided with recesses formed in opposite edge surfaces, the recesses on respective surfaces of said member being constructed and arranged to receive portions of respective heating units, so as to support said units from the opposite marginal surfaces.

2. In combination: an arcuate heating element comprising a resistor embedded in insulating material disposed in a metallic sheath; and means for supporting said heating element, including a metallic member, and including welds permanently fastening said metallic member to said metallic sheath at different respective intersecting places of said member and said sheath, said sheath being arcuate at at least one of said places.

3. In combination: an elongated heating element comprising a resistor embedded in insulating material disposed in a metallic sheath, said heating element being of non-rectilinear form and defining a general plane; a metallic generally V-shaped plate member extending transversely of said heating element at a plurality of places, and welds permanently fastening said plate member to said heating element so constructed and arranged that said heating element and said plate member form a self-sustaining unit; and means whereby said plate member may be detachably fastened to a support, so constructed and arranged that the general plane of said unit extends laterally from the support.

4. In combination: a spirally shaped heating element comprising a resistor embedded in insulating material disposed in a metallic sheath; and means for supporting said heating element, including a metallic member having recesses extending transversely into said member from a margin thereof, said heating element having convolutions intersecting said member and disposed in said recesses, and including welds permanently fastening said metallic member to said metallic sheath at both ends of said sheath.

5. Heating apparatus, comprising: a plurality of heating elements; and supporting means constructed and arranged to support said heating elements, said supporting means including a metallic plate member the general plane of which extends transversely of said heating elements at intersections of said plate member and said heating elements respectively, said plate member having a plurality of recesses extending transversely into said plate member in opposite directions from opposite longitudinally extending narrow sides of said plate member, said supporting means being so constructed and arranged that said heating elements are disposed in said recesses respectively.

6. In combination: heating apparatus including an electrical heating element, a fan adapted to cause a stream of air to flow against said heating element, and a motor for driving said fan; electric switch means, having operating means, constructed and arranged to control said heating apparatus; means mounting said heating element and said motor and said switch means on a support; and cover means for said heating apparatus, having an opening through which said operating means extends, said cover means being so constructed and arranged that said cover means may be applied to and removed from said heating apparatus in a direction transverse to the axis of said motor while leaving said heating apparatus and said switch means in assembled condition.

7. Heating apparatus, comprising: a plurality of heating elements each provided with longitudinally spaced fin means extending transversely of said elements; and supporting means, including a metallic plate member the general plane of which extends transversely of said heating elements at intersections of said plate and said heating elements respectively between elements of said fin means, said supporting means being so constructed and arranged that at least two of said heating elements are engaged and supported by said plate member from opposite longitudinally extending narrow sides of said plate member.

8. In combination: a heating element comprising a resistor embedded in insulating material disposed in a metallic sheath the general longitudinal locus of which is spiral; and means for supporting said heating element, including a metallic member, and including welds permanently fastening said metallic member to said metallic sheath at spaced parts of said spiral sheath.

9. In combination: an arcuate heating element comprising a resistor embedded in insulating material disposed in a metallic sheath; and means for supporting said heating element, including a metallic member, and including welds permanently fastening said metallic member to said metallic sheath at different respective intersecting places of said member and said sheath, said sheath being arcuate at at least two of said places.

10. Heating apparatus, comprising: a plurality of heating elements, each element comprising a resistor embedded in insulating material disposed in a metallic sheath; and supporting means constructed and arranged to support said heating elements, said supporting means including a metallic plate member the general plane of which extends transversely of said heating elements at intersections of said plate member and said heating elements respectively, said plate member having a plurality of recesses extending transversely into said plate member in opposite directions from opposite longitudinally extending narrow sides of said plate member, said supporting means being so constructed and arranged that said heating elements are disposed in said recesses respectively.

11. In combination: heating apparatus including an electrical heating element, a fan adapted to cause a stream of air to flow against said heating element, and a motor for driving said fan; electric switch means, having operating means, constructed and arranged to control said heating apparatus; a support; bracket means mounting said motor on said support; means mounting said heating element on said support; means mounting said switch means on said bracket means; and cover means for said heating apparatus, having an opening through which said operating means extends, said cover means being so constructed and arranged that said cover means may be applied to and removed from said heating apparatus while leaving said heating apparatus and said switch means in assembled condition.

12. In combination: heating apparatus including an electrical heating element, a fan adapted to cause a stream of air to flow against said heating element, a motor for driving said fan, and housing means, for said motor and said heating element, having an opening adjacent said heating element and an opening adjacent said motor; electric switch means, having operating means, constructed and arranged to control said heating apparatus; means mounting said heating element and said motor and said switch means within said housing means; and said housing means comprising cover means having a portion extending in a direction transverse to the general plane of said housing openings, said portion having an opening through which said operating means extends, said cover means being so constructed and arranged that said cover means may be applied to and removed from said housing means while leaving said heating apparatus and said switch means in assembled condition.

13. In combination: a heating element comprising a resistor embedded in insulating material disposed in a metallic sheath; the general longitudinal locus of which is a plane spiral and means for supporting said heating element, including a metallic member, and including welds permanently fastening said metallic member to said metallic sheath approximately at the respective ends of said spiral.

14. In combination: a heating element comprising a resistor embedded in insulating material disposed in a metallic sheath; and means for supporting said heating element, including an elongated metallic plate member having lateral surfaces transverse to the general direction of said sheath near its ends, and including welds permanently fastening said metallic plate member to said metallic sheath at both ends of said sheath at said lateral surfaces respectively.

15. Heating apparatus, comprising: a plurality of heating elements each having a body portion comprising a metallic sheath, a resistor disposed in said sheath, and means insulating said resistor from said sheath; and supporting means, including a metallic plate member the general plane of which extends transversely of said sheaths at intersections of said plate member and said sheaths respectively, said supporting means being so constructed and arranged that at least two of said elements are engaged and supported, at places intermediate the ends of said sheaths, by said plate member from opposite longitudinally extending narrow sides of said plate member.

16. Heating apparatus, comprising: a plurality of heating units, each having a body portion comprising a metallic sheath of oblong cross-sectional outline; a resistor disposed in said sheath, and means insulating said resistor from said sheath; means for directing a stream of fluid against said units; and supporting means, including a metallic plate member the general plane of which extends transversely of said sheaths at intersections of said plate member and said sheaths respectively, said supporting means being so constructed and arranged that at least two of said elements are engaged and supported, at places intermediate the ends of said sheaths, by said plate member from opposite longitudinally extending narrow sides of said plate member and that said elements are disposed edgewise of the stream of fluid.

17. In combination: heating apparatus including an electrical heating element, a fan adapted to cause a stream of air to flow against said heating element, a motor for driving said fan and housing means, for said motor and said heating element, having an opening adjacent said heating element and an opening adjacent said motor; electric switch means, having operating means, constructed and arranged to control said heating apparatus; bracket means constructed and arranged to mount said motor within said housing means; means mounting said heating element within said housing means; means mounting said switch means on said bracket means; and said housing means comprising cover means having a portion extending in a direction transverse to the general plane of said openings, said portion having an opening through which said operating means extends, said cover means being so constructed and arranged that said cover means may be applied to and removed from said heating apparatus while leaving said heating apparatus and said switch means in assembled condition.

18. In combination: a heating element comprising a resistor embedded in insulating material disposed in a metallic sheath; the general longitudinal locus of which is a plane spiral and means for supporting said heating element, including a metallic member, and including a weld permanently fastening said metallic member to said metallic sheath.

EDWIN L. WIEGAND.